United States Patent Office 3,266,827
Patented August 16, 1966

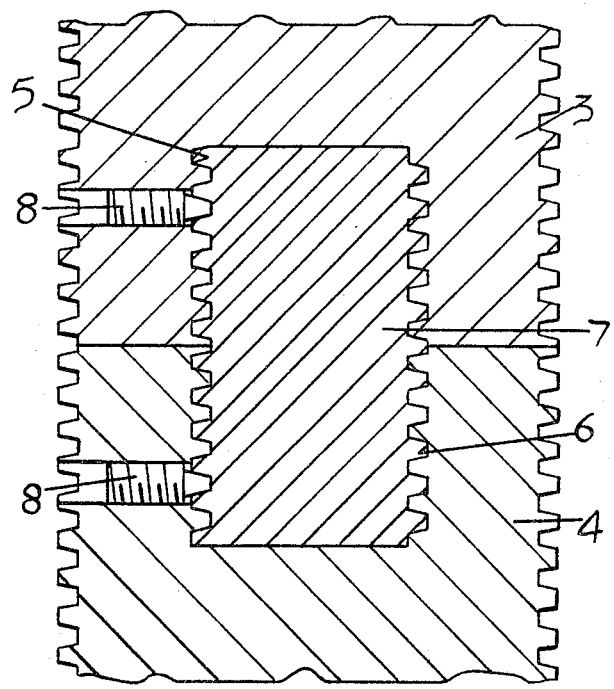

3,266,827
METHOD OF AND MEANS FOR INTERCONNECTING EXTERNALLY SCREW-THREADED SHAFTS
John Charles Frederick Whicker, Tring, England, assignor to Joseph Lucas (Industries) Limited, Birmingham, England
Filed Dec. 18, 1963, Ser. No. 333,257
Claims priority, application Great Britain, Dec. 21, 1962, 48,292/62
6 Claims. (Cl. 287—127)

This invention relates to a method of, and means for, interconnecting externally screw-threaded shafts so that a nut can run freely from one shaft to the other.

A method according to the invention comprises forming in the ends of the shafts to be interconnected axially extending internal screw-threads with the pitch of the threads equal to the pitch of the external threads on the shafts and the crests and roots of the external threads radially aligned with the roots and crests respectively of said axially extending internal threads, engaging with said axially extending internal thread on one shaft an externally screw-threaded spigot having a thread of pitch equal to the pitch of the threads on the shafts, the axial length of the screw thread on the spigot being such that it projects from said one shaft, and engaging said axially extending thread on the other shaft with the projecting end of the spigot.

Means according to the invention comprises axially extending internal screw-threads formed in the ends of the shafts with pitch of the threads equal to the pitch of the external threads on the shafts and the crests and roots of the external threads radially aligned respectively with the roots and crests of the axially extending internal threads, and an externally screw-threaded spigot engaged with the axially extending threads on both shafts, the pitch of the thread on the spigot being equal to the pitch of the threads on the shafts.

The accompanying drawing is a sectional side view illustrating one example of the invention.

Referring to the drawing, it is required to interconnect a pair of similar externally screw-threaded solid shafts 3, 4 so that a nut can run freely from one shaft to the other. For this purpose axially extending and internally screw-threaded blind bores 5, 6 are formed in the ends of the shafts 3, 4 respectively. The screw-threads in the bores are cut so as to have a pitch exactly equal to the pitch of the external threads on the shafts 3, 4 and moreover the arrangement is such that the crests and roots respectively of the external threads are radially aligned with the roots and crests respectively of the internal threads.

There is further provided an externally screw-threaded spigot 7 having a screw-thread of pitch equal to the pitch of the screw-thread of the shafts. In order to secure the shafts together, the spigot is first engaged with the blind bore in one of the shafts 3, 4. The length of the spigot is such that when it is so engaged it protrudes from said blind bore. The blind bore in the other shaft is then engaged with the protruding end of the spigot 7, and finally the shafts are locked to the spigot by means of a pair of locking screws 8 extending radially into the shaft and engaging with the roots of the thread on the spigot 7.

It will be appreciated that it is not necessary for the shafts 3, 4 to be in contact, provided that the gap between them is sufficiently small to allow a nut to run freely from one shaft to the other. The reason for this is that by virtue of the arrangement of the threads, it is impossible for the external threads on the shafts 3, 4 to be out of alignment. Moreover, the shafts need not in all applications be locked to the spigot by means such as the screws 8, and the invention is equally applicable to hollow shafts. It will be understood that the nut which is to run freely between the shafts could be of the re-circulating ball type.

The spigot 7 may be formed with a flat at one end, so facilitating engagement of the spigot with one blind bore. In this case the other blind bore must be elongated to receive the flat. Moreover, one of the shafts may be formed with a passage therethrough for receiving a bar through which the shaft may be tightened.

In a modification, the blind bores are of truncated conical form with their wider ends outermost. The axially extending internal threads are not in this case parallel to the external threads, but the conditions mentioned above with regard to the pitch and positions of the threads are the same. The spigot 7 is shaped complementarily to the blind bore.

Having thus described my invention what I claim as new and desire to secure by Letters Patent is:

1. A method of interconnecting externally screw-threaded shafts so that a nut can run freely from one shaft to the other, comprising forming in the ends of the shafts to be interconnected axially extending internal screw-threads of the same hand as the external threads and with the pitch of the threads equal to the pitch of the external threads on the shafts and the crests and roots of the external threads radially aligned with the roots and crests respectively of said axially extending internal threads, engaging with said axially extending internal thread on one shaft an externally screw-threaded spigot having a thread of pitch equal to the pitch of the threads on the shafts, the axial length of the screw thread on the spigot being such that it projects from said one shaft, and engaging said axially extending thread on the other shaft with the projecting end of the spigot.

2. A method as claimed in claim 1 in which the spigot is locked relative to the shafts after assembly.

3. Means for interconnecting externally screw-threaded shafts so that a nut can run freely from one shaft to the other, comprising axially extending internal screw-threads of the same hand as the external threads and formed in the ends of the shafts with pitch of the threads equal to the pitch of the external threads on the shafts and the crests and roots of the external threads radially aligned respectively with the roots and crests of the axially extending internal threads, and an externally screw-threaded spigot engaged with the axially extending threads on both shafts, the pitch of the thread on the spigot being equal to the pitch of the threads on the shafts.

4. Means as claimed in claim 3 in which the shafts are solid and the axially extending screw-threads are formed in blind bores in the ends of the shafts.

5. Means as claimed in claim 4 including a pair of locking screws extending radially into the shafts respectively and engaging the roots of the thread on the spigot.

6. Means as claimed in claim 5 in which the blind bores are of truncated conical form with their wider ends outermost, and the spigot is shaped complementarily to the bores.

References Cited by the Examiner
UNITED STATES PATENTS

| 139,092 | 5/1873 | Urie | 287—127 |
|---|---|---|---|
| 1,085,515 | 1/1914 | Wills | 287—125 X |
| 2,404,145 | 7/1946 | Schweickart | 287—2 |
| 2,941,828 | 6/1960 | Hund et al. | |

CARL W. TOMLIN, *Primary Examiner.*

A. V. KUNDRAT, *Assistant Examiner.*